April 23, 1974  R. J. MITCHELL  3,806,471

PRESSURE RESPONSIVE RESISTIVE MATERIAL

Filed April 29, 1968  7 Sheets-Sheet 1

INVENTOR.
ROBERT J. MITCHELL
BY
Fraser and Bogucki

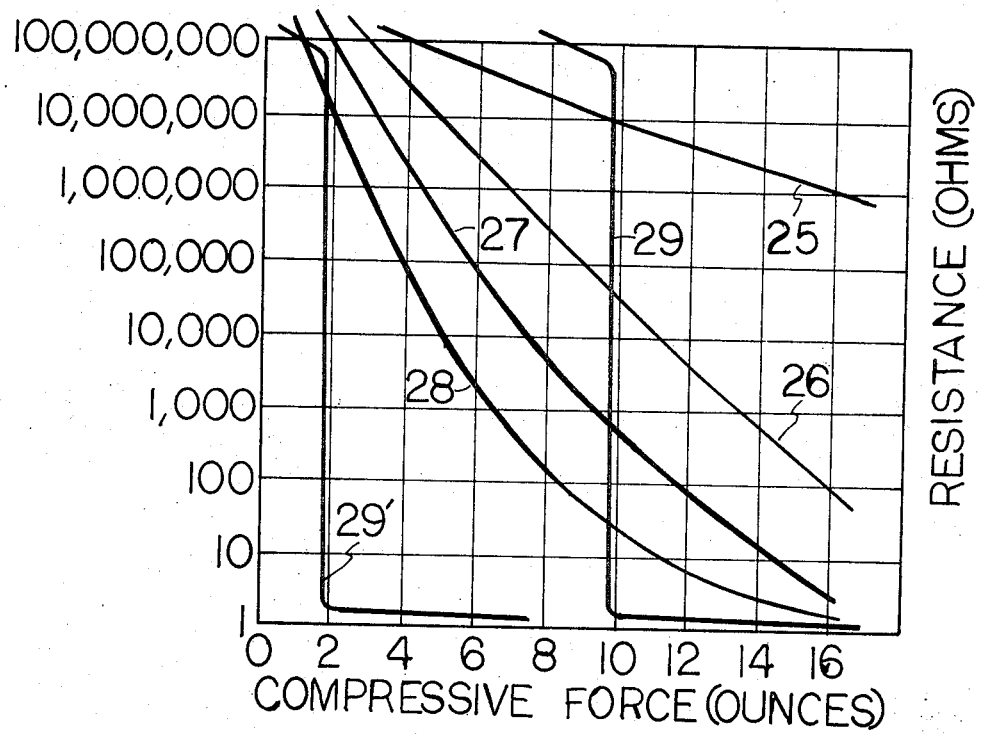
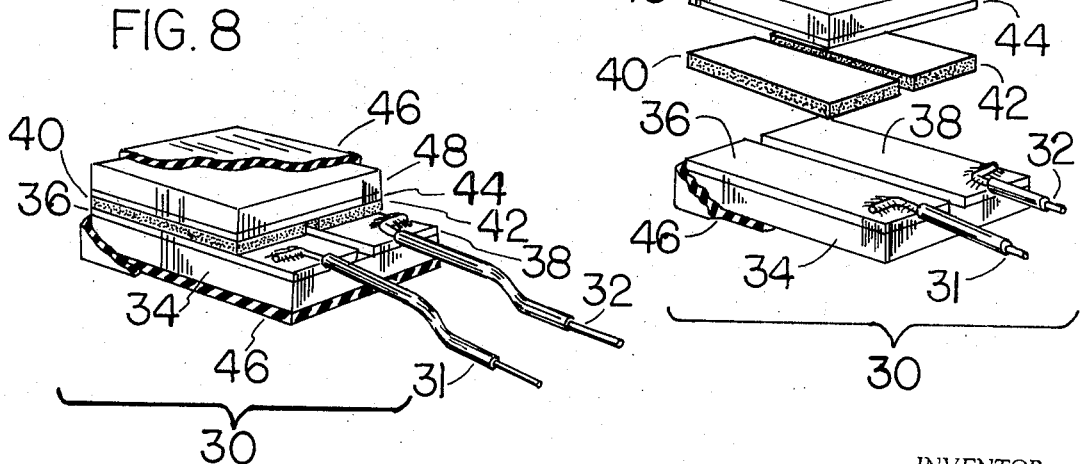

April 23, 1974  R. J. MITCHELL  3,806,471
PRESSURE RESPONSIVE RESISTIVE MATERIAL
Filed April 29, 1968  7 Sheets-Sheet 3

INVENTOR.
ROBERT J. MITCHELL
BY
Fraser and Bogucki

April 23, 1974 R. J. MITCHELL 3,806,471
PRESSURE RESPONSIVE RESISTIVE MATERIAL
Filed April 29, 1968 7 Sheets-Sheet 6

INVENTOR.
ROBERT J. MITCHELL
BY
*Fraser and Bogucki*

United States Patent Office 3,806,471
Patented Apr. 23, 1974

3,806,471
PRESSURE RESPONSIVE RESISTIVE MATERIAL
Robert J. Mitchell, 1845 N. El Molino Ave.,
Pasadena, Calif. 91104
Filed Apr. 29, 1968, Ser. No. 724,791
Int. Cl. H01b 1/06; H01c 9/06
U.S. Cl. 252—518                 1 Claim

ABSTRACT OF THE DISCLOSURE

Materials and sensing elements having controlled changes of resistance values in response to pressure are provided by volumetrically dispersing conductive or partially conductive particulates of at least one type throughout a predetermined volume. The particulate mass is finitely but minutely compressible in at least one dimension, but confined in other dimensions within an encompassing structure or by a binder or matrix. The particle dispersion is such that without applied pressure the element, typically formed in a relatively thin stratum, has a composite resistance value determined by multiple current flow paths, and this value may be so high as to render the material essentially nonconductive. Applied or increased pressure compacts the particles such as to increase the number of current flow paths, increase the contact area between particles and therefore the area of the current flow paths, and also increase internal strains, while decreasing the inter-particle contact residence and the flow path lengths, all these factors concurrently acting to decrease the resistance of the element. The compression and movement are very limited in extent, and the current flow is changed in essentially solid state fashion, without arcing or cross-over. Particulates, binders and buffering powders are disclosed that are subject to minimum hysteresis effects and wear. The rate of resistance change of pressure, and the range of resistance values are controlled and selected by variation of a number of factors, including the properties and ratios of the materials used, the thickness of the element, the area under compression, the applied voltage and the configuration and spacing of coupled electrodes.

BACKGROUND OF THE INVENTION

Field of the invention

This invention relates to electrical components and devices and electrically resistive materials and more particularly to pressure, temperature and voltage responsive materials, and to electrical switching elements and transducers.

Description of the prior art

Pressure and load responsive electrical transducers are widely employed at present, although particular types of these devices are usually limited to use in specialized applications. In response to force, which may be translated into terms of load or pressure, the transducer modifies electrical signal characteristics in some manner. One form of widely used load responsive element is the strain gauge, which generally comprises a monolithic semiconductor element or a sinuously configured wire element. Because only low signal levels can safely be carried by these devices they are used primarily in instrumentation systems. Strain gauges and other forms of load transducers are also generally quite complex or costly if they are made to be linear, sensitive and stable. Further, they are relatively delicate and typically cover only a specific small load and resistance range.

There are of course many other pressure or load responsive mechanisms, including such devices as microphones, which respond to pressure variations to generate a correspondingly varying electrical signal. These components do not satisfy the need for high current-carrying pressure responsive transducers that can be actuated manually or by mechanical devices, either in transient or steady-state fashion, to provide sufficient power to directly control other elements. Some pressure sensitive paints and films that can operate under high pressure loading and high electrical signal levels have been known for some time. These sensors, however, utilize complex formulations, have high hysteresis, and have characteristics which change with time and use and are not readily controllable. Other pressure sensitive devices include the carbon microphone and the carbon pile rheostat, but both are suitable only for their specific uses. The former has high speed response but only over a limited range, whereas the latter is extremely bulky, is difficult to cool, and requires very high compressive forces for useful resistance change.

Electrical resistors are basic components for electronic and higher power electrical circuits. Resistors of variable value are typically the best low-cost means of making a power, timing, or phase adjustment in a circuit, and a wide variety of low and high precision potentiometers and rheostats are available for this purpose. With the growth of the electronics industry, need has arisen for new and different types of resistors, both fixed and variable in value, and very large to very small in size. One relatively new type is exemplified by the Cermet resistors, comprising an admixture of heat-fused ceramic, metallic oxide and/or metallic materials, which are useful particularly where small size and high temperature resistance are required. Carbon powder or composition resistors are known that have relatively constant characteristics over a narrow temperature range, but change greatly as temperature exceeds that range. Metallic film and other relatively new resistance elements also demonstrate the continued need for elements having other new and superior properties, to meet the requirements of electronic systems, including such specialized forms as miniaturized circuits.

The need in domestic and industrial applications to control high current levels by readily adjustable means is perhaps even more significant. There is an increasing tendency to utilize semiconductor and other forms of gating devices to control power for consumer and industrial systems. Controlled switching of alternating current at high rates of speed, as in the well-known "Triac" and "back-to-back SCR" circuits, is used in operating power tools, regulating light sources, and in servo systems, among many examples. Many alternative phase-firing systems are also used for these purposes. There are, however, many situations in which these circuits are too expensive or electrically noisy. A device that could simply and directly control relatively high current levels in off-on modes would provide a completely different form of circuit element useful in many of these applications with substantial advantage.

BRIEF SUMMARY OF THE INVENTION

New electrical materials in accordance with the invention utilize volumetric dispersions of at least one type of particulate material that is at least partially conductive in nature and is disposed within a predetermined volume of relatively small depth. The particulate mass, generally but not necessarily of planar form, is constrained by an external structure, a binder or a matrix, and has limited resilient compressibility. The dispersed particles are of relatively small size and of sufficient density to provide multiple, variable conductive paths through the material between spaced-apart electrodes. The paths have both conductive and resistive segments. Under predetermined load and voltage conditions the material has a known initial composite resistance value. In response to an applied force the number of flow paths, the current flow and the internal strains increase, while the lengths of the flow paths, the contact resistances between particles, and the number of contacts in each path concurrently decrease, providing controlled rates of resistance change between widely separated limits in response to low force variations. Through use of low volumes of material in planar form, internally generated heat may readily be dissipated through associated electrodes or heat sink elements.

Further in accordance with the invention, selected predetermined operative characteristics are achievable through arrangement of materials and the configurations of the transducers. One or more particulates may be used, separately or in combination, and binders and buffering elements may also be employed. The particulates may exhibit ohmic or rectifying contact characteristics, or materials of both types may be used together. The binder material may comprise an elastomer, as one example, it generally being preferred to employ minimum binder materials in pressure responsive transducers. Buffering powders are preferred to be insulating or high-resistivity semiconductive particulates having size and hardness corresponding generally to the active particulates. In specific materials in accordance with the invention, the particles are of less than approximately 50 mesh size, typically of the order of approximately 600 mesh, providing a high but finite number of three-dimensionally distributed current flow paths through a small transducer.

Devices in accordance with the invention are essentially solid-state elements, substantialy free of arcing and crossover effects. Further, they have extremely long life and maintain constant characteristics, free of hysteresis and wear effects, unless subjected to crushing loads. They may be employed with sufficiently high current and voltage levels to operate directly a variety of electrical components and mechanisms. Broadly, these devices comprise resistors and transducers in virtually all impedance and size ranges, and both fixed value and variable devices. Specific configuration of variable resistance materials, electrodes and supporting structures may be used to provide superior mechanical stability, repeatability, small size, simplicity or improved heat dissipation. Because of the three dimensional nature of the current flow, particular dispositions of the electrodes can also be used to modify the electrical characteristics as well. The materials are also voltage sensitive and temperature sensitive to varying degrees, and may be used to compensate for or utilize these properties.

Specific devices in accordance with the invention permit predetermined control of the rate of resistance change with applied force. The slope of the resistance-force characteristic may in effect be varied from an extremely low angle to a sharp almost vertical slope that represents a virtually instantaneous change between conductive and nonconductive states, either by extreme sensitivity or by what may be termed an avalanche effect. In addition, the limiting resistance values may be adjusted to provide predetermined upper and lower resistance limits related to specific upper and lower or pressure values. The forces required can be low enough for convenient direct manual operation, such as one pound or less, and typical units are infinitely variable between extremely broad limits from low values (e.g. one ohm per square) to virtually infinite (e.g. over 100 megohms per square) values.

Switching or bistate elements achieve sharp transition characteristics by suitable selection and arrangement of the particulate matter, density, and volumetric relationship. The principal operative factors not only act cumulatively in the same sense, but apparently augment each other at a crticial operative point, such that the element changes abruptly from a nonconductive or high-resistance state to a conductive state. The switching elements may comprise either ohmic-contact particulate matter or rectifying-contact particulate matter, including but not limited to semiconductive materials of opposite conductivity types. Ohmic-contact materials, and semiconductive materials of like conductivity types, achieve the avalanche effect by the use of at least two types of particles having different electron work functions, which synthesize rectifying contacts. In certain elements in accordance with the invention the active particles are neither purely conductive nor semiconductive, but comprise surface-reacted conductive particles that achieve rectifying characteristics because conduction is primarily a phenomenon between the reacted surface and the unreacted interior. These particulates are particularly suited for high voltage application. Bistate or binary switching devices may also be achieved independently of the avalanche effect by the use of external mechanisms having at least two distinct or discrete states of operation. In one example, a toggle mechanism may be operated to switch the variable resistance element between load and no-load states.

Devices in accordance with the invention are generally but not necessarily thin planar elements that may be varied in thickness. The resistor or transducer is typically configured to provide a readily accessible manually or mechanicaly engageable surface. Planar electrodes of substantial area and high heat conductivity may be disposed in facing contacting relation to the pressure sensitive material, so as to provid efficient current coupling and effective heat sinks. A given device may use a pair or more of variable resistance elements, and two or more electrodes on either or both sides of the device. Successive layers of similar or dissimilar materials may also be employed as the pressure sensitive element to produce extremely varied device characteristics.

Continuously variable resistance devices may also be used with analog mechanisms mechanically biasing the materials with an associated spring or other element. Adjustment of the mechanical bias may be used to determine the initial resistance or operative range for load, voltage and temperature responsive units.

Temperature compensation of the elements may be effected by suitable variation of the active, buffering or binding materials, or combinations of them, and also by external mechanical means, including the use of bimetallic elements and temperature compensating linkages.

BRIEF DESCRIPTION OF THE DRAWINGS

A better understanding of the invention may be had by reference to the following description, taken in conjunction with the accompanying drawings, in which:

FIG. 7 is a graphical representation, with force and resistance values comprising the reference axes, of the characteristics of various devices in accordance with the invention;

FIG. 8 is a perspective view, partially broken away, of a second device in accordance with the invention, utilizing rectifying-contact particulates;

FIG. 9 is an exploded perspective view of the device of FIG. 8;

DETAILED DESCRIPTION OF THE INVENTION

Example I

Figure 1:
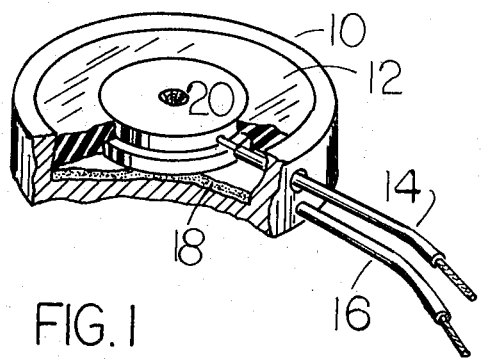
FIG. 1 is a perspective view, partially broken away, of a force or pressure responsive transducer in accordance with the invention, utilizing ohmic-contact particulates.
Figure 2:
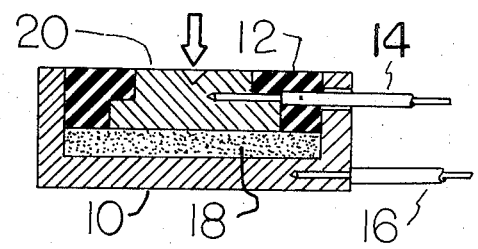
FIG. 2 is a side sectional view of the arrangement of FIG. 1.

One form of a force responsive transducer in accordance with the invention is shown in FIGS. 1 and 2, to which reference is now made. A pair of electrodes 10 and 20 are disposed on opposite sides of a stratum or thin film 18 of force responsive resistive material. Each of the electrodes is substantially coextensive with and in facing contacting relation to a different broad face of the resistive element 18. One electrode 10 is cup-shaped, and the element 18 fits into the bottom of the cup in a non-expandable status. The other electrode is approximately disc shaped, and rests on the opposite side of the element 18, both electrode surfaces making intimate electrical contact with the element 18. In this example, the element 18 is of the order of 0.1 inches in thickness, although this may be varied widely in accordance with considerations set out hereafter. The transducer itself is disc shaped and of the order of approximately one inch in diameter, although it need not be disc shaped and its size may also be widely varied. For applications in which the transducer is to be handled manually, it is desirable to employ an outer insulative coating (not shown) on each of the different electrodes 10, 20. External terminals 14, 16 for coupling to a suitable electrical circuit (not shown) are each connected by conventional means, such as soldering, welding or mechanical constraint to a different one of the conductive electrodes 10, 20. The resistive material 18 is sealed from moisture, surface electrical leakage and contamination by an annular sealant 12, which also serves to bind the assembly together. The deployment of sealant 12 in the annular space between disc electrode 20 and cup electrode 10 allows sealant shrinkage during its cure without imposing false compressive loads on the resistive element 18. Shrinkage forces in this configuration are essentially parallel to the face of the resistive element 18. In sensitive devices, such as that of the present example, shrinkage forces can introduce a significant mechanical bias, thus shifting end point values and adversely affecting sensitivity.

The readily fabricated assembly thus far described responds to applied force to present resistivity variations to an associated utilization circuit. The circuit (not shown) establishes an inter-electrode potential, such that current passes from one terminal 14 through one electrode 20, then through multiple flow paths in the resistive element 18 in directions generally normal to the broad face of the resistive element, and then through the opposite electrode 10 and to the other terminal 16. The electrical current is regulated by the force sensitive material 18, in response to the amount of force applied to the material. Heat generated in the relatively low volume resistive layer is readily dissipated through the intimately contacting, spaced apart electrodes 10, 20, which make intimate areal contact with a substantial part of the area of the force sensitive material 18.

The material 18 has the property of varying in electrical resistance in inverse relation to the compressive force applied through the electrodes 10, 20. Broadly, the resistive material 18 comprises at least one generally granular powder, the particles of which are at least partially electrically conductive. The powder or powders are retained in close, non-expandable association by confinement within the assembly or by coating or impregnation with an insulating bonding material. The material may be said to have limited resilient compressibility as a mass, because the inter-particle spaces are minutely compactible, but remain substantially in their original disposition. The The volumetric dispersion of the particles remains essentially unchanged as compaction varies, although inter-particle spacings and contact do change. The powders are said to be at least partially conductive because they may include both conductors and semiconductors. In the practical example of FIGS. 1 and 2, an ohmic-contact type of material, namely tungsten carbide, is bonded in an elastomeric material, namely RTV (Room Temperature Vulcanizing) silicone rubber. The elastomer confines the particles within a selected nominal volume, and the mass may be compacted somewhat but is non-expandable. A hollow chamber such as that defined by the electrodes 10, 20 and the sealant 18 is typically employed for the purpose of confinement of a powder or powders without a binder or restraining matrix.

Although the particulate employed may comprise one or a number of materials, possibly including insulating particulates, but always including active particulates that may vary in properties from excellent conductivity to true semiconductors such as gallium arsenide and germanium, the active particulates may be characterized both as being at least partially conductive and also as being volumetrically distributed within a confined volume with a density such as to provide multiple but finite numbers of electrical current paths of different lengths and path areas through the volume. The path lengths include both resistive and conductive portions and therefore the paths are not only volumetrically distributed but longitudinally segmented as well into conductive and resistive portions. The total resistivity of each particle includes an internal (bulk) resistivity factor, as well as surface resistivity factors. Of these factors, the greatest force-related resisitivity change occurs at the particle surface rather than internally. Consequently, reference is made herein to the contact nature of the particles instead of their internal character. The composite resistance of a given device is determined by all of these, as well as other factors.

Figure 3:
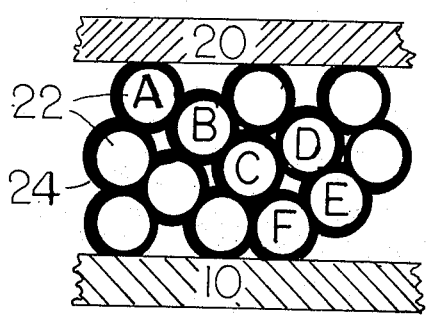
FIG. 3 is an idealized simplified representation of a fragment of the arrangement of FIGS. 1 and 2, illustrating the particle distribution in an unloaded state.
Figure 5:
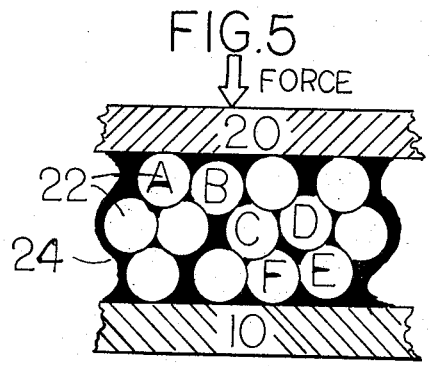
FIG. 5 is an idealized simplified representation corresponding to FIG. 3, but illustrating particle distribution in a mechanically loaded state.
Figure 4:
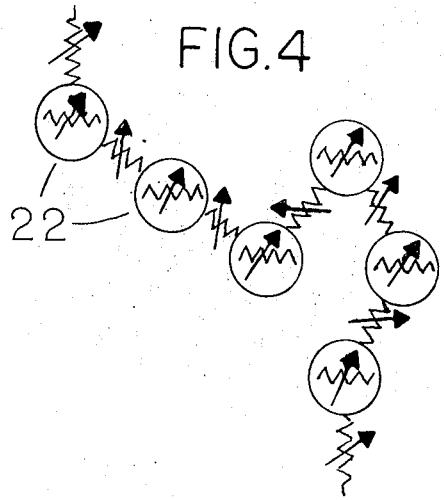
FIG. 4 is an idealized simplified representation of a typical current flow path in the state exemplified by FIG. 3.
Figure 6:
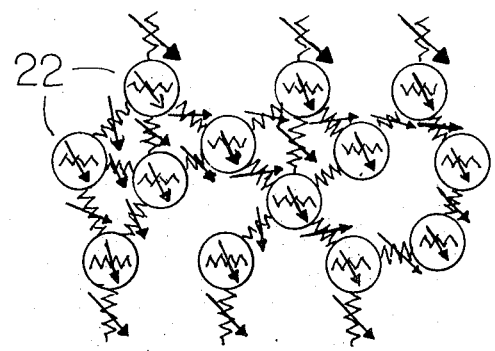
FIG. 6 is an idealized simplified representation of typical current flow paths in the state exemplified by FIG. 5.

The idealized representations of FIGS. 3 and 5, and the related diagrammatic representations of FIGS. 4 and 6 respectively illustrate the relationships and variations involved in different conditions of operation. In FIG. 3 the particulate mass has been shown as greatly expanded in size and the number of particles has been greatly reduced in relative number, in order to illustrate the variable resistance phenomenon. As shown, the tungsten carbide particles 22 are confined within an elastomeric binder 24 that is represented as a relatively uniform coating on each of the particles 22. The particles 22 are generally not larger than 50 mesh, preferably being about 600 mesh in this particular example, and generally of the order of approximately 100 mesh. The particles 22 in this example occupy a substantial part, e.g. between 80 and 98% of the total volume.

In FIG. 4, one typical bidirectional flow path in the mechanically unloaded state is represented as passing between the electrodes 20, 10 through the successively contacting particles A, B, C, D, E and F, respectively. A multiplicity of nonparallel current paths exist that are randomly distributed throughout the volume. While current flows between the electrodes, the paths change direction along their lengths as determined by the random particle distribution. Because of the presence of the binder 24, the particulate mass compacts within a relatively smaller volume when force is applied in a direction normal to the broad faces of the electrodes 10, 20. The overall degree of compaction is minute and limited but nonetheless finite and significant in terms of interparticle relationship. Under compression, as shown generally in FIG. 5, the number of bidirectional current flow paths along the particles is effectively multiplied. The contrast in the number of flow paths is best illustrated by comparison of the idealized views of FIGS. 4 and 6. While increasing the number of flow paths lowers resistance, other effects also take place. For example, electrical resistance is also changed by shortening of the mean electrical path length between the electrodes, by enlarging the contact area between particles (thereby increasing the mean diameter of the conductive path), and by increasing internal strain within the particles. Resistance is also reduced as the number of contacts in each path decreases, because the voltage per contact increases and invokes the voltage sensitivity of the contacts. Furthermore, the contact resistance between particles is lowered due to more intimate atomic contact as well as greater areas of contact. Each of these mechanisms decreases electrical resistance as compressive load increases, to produce a very large combined resistance-reducing effect. The cumulative variation in the same sense of these factors changes the composite resistance of the element 18 over a wide dynamic range for relatively small changes in applied force of low level, such as approximately one pound or less. Although lesser ranges may be used, as desired, these ranges readily encompass limits that differ by at least an order of magnitude. Resistance variations of such scope have not heretofore been achievable repeatably in response to low force variations. The particle resistances and the contact resistances are both shown as variable elements in FIGS. 4 and 6 and it should be understood that both these factors are reduced in value in the mechanically loaded state (FIG. 6). Electrically a multiplicity of series and parallel conductive-resistive paths pass through the particulate mass.

The range and sensitivity of these force responsive transducers are functions of the material, its thickness, the area under compression, the applied voltage, and the temperature. The material itself may vary widely, because as is described in greater detail below, the particulates may not only comprise one or more powders but may in addition be utilized in different ratios and in mixtures of unlike materials (ohmic-contact or rectifying-contact or both) with or without binders, with or without buffering agents in particle form, and with varying ratios of open voids to particle volumes. Dependent upon these considerations it is feasible within the teachings of the invention to achieve resistance changes of megohms per gram of force, or only a few ohms per ton of force. The elements are generally but not necessarily planar, and generally are thin, as between approximately .001 and 0.25 inch to facilitate heat transfer out of the material into the electrodes, and to raise mechanical and electrical frequency response. Greater thicknesses, up to approximately one inch, may be employed at corresponding cost in loss of sensitivity, range and heat dissipation properties.

The following specific examples are given of suitable ohmic-contact materials:

(1) Molybdenum disulfide powder. This is a high-resistance semiconductor material particularly suitable for low current densities and high voltages with thin films, and provides excellent internal lubrication.

(2) Sponge iron powder and iron oxide (insulator). This material should be sealed from atmosphere, but is extremely low cost and is capable of high current densities. It can also be loaded or biased by external magnetic fields. Resistivity can be greatly increased by partial oxidation during fabrication or by addition of iron oxide powders.

(3) Tungsten carbide powder. This material has extreme resistance range, good wear properties, very high modulus of elasticity, and excelent heat tolerance. Its low resistivity when fully loaded permits high current densities.

(4) Tin oxide powder. This is a high resistivity material with low temperature coefficient of resistance, with good wear properties, and with good (high) modulus of elasticity.

(5) Boron powder. This is a high resistivity material with a very high negative temperature coefficient of resistance. This is useful in temperature sensors, discussed below, and in compensating for positive temperature coefficient of resistance in other materials.

The curves of resistance in ohms versus compressive force in ounces shown in diagrammatic form in FIG. 7 depict typical achievable characteristics, and represent a wide range of slope and end point characteristics. Materials of substantially linear characteristics having an unloaded resistance approaching infinity are illustrated by the materails of curves 25 and 26. Materials having only slight nonlinearity but varying between essentially infinite and essentially zero resistance between the unloaded and loaded conditions are illustrated by curves 27 and 28. Substantially different effects are obtained by virtue of a discontinuous or switch-over characteristic illustrated by curves 29 and 29', which represent the characteristics of essentially bistate materials that change from extremely high resistance to essentially zero resistance upon exceeding a selected threshold force. This is referred to herein as an "avalanche" effect and is discussed in greater detail below. Curves 29 and 29' are actually achieved with identical materials, with a bias mechanical load accounting for the apparent difference in the threshold force.

It will be noted that the operative characteristics represented by the curves 25 to 29' of FIG. 7 represent the application of forces not in excess of one pound and therefore well within the range most conveniently exerted manually or readily applied by simple mechanical means. Thus devices in accordance with the invention are infinitely variable between virtually infinite impedance (e.g. >100 megohms per square) and very low impedance (e.g. approximately one omh per square). Variations of resistive values between less than 10 ohms and more than 10 megohms with a load variation of less than one pound per square centimeter of surface are readily attainable. FIG. 7 represents the independent variable in terms of force because in most operative situations pressure is a less meaningful term. Bearing in mind that most devices in accordance with the invention will preferably be small, such as less than 1 in.$^2$ in area, suitable pressures for any given area may be achieved.

Ohmic-contact materials, such as the aforementioned tungsten carbide powder, are preferably employed in layers of less than .010 inch thickness and may be used readily at voltages of up to approximately 12 volts AC (RMS) or DC, but have been used at voltages up to approximately 120 volts AC (RMS). It is preferred to employ thin layers, because of the resultant efficiency in dissipation of heat through the electrical contacts, and because of higher electrical and mechanical frequency responses. In this instance the voltage is generally limited to approximately five volts or less. The tendency toward current breakover is eliminated if these conditions are observed. Higher current may be carried by employing larger area layers. Higher voltages may be employed with higher ratios of insulating powders and elastomeric materials, in thicker sections, because both of these insulators and the thicker sections effectively increase the number of conductive contacts in series in the electrical path, and thereby reduce the voltage across each contact.

Example II

Ohmic-contact materials have been described at the outset only to provide a readily appreciated type of construction. It is preferred for many applications, however, to employ rectifying-contact particulates. The rectifying-contact particulates, which may include materials having bulk semiconductor properties, are usually preferred because, when used singly or in various combinations, they are more tolerant of higher voltages for a given thickness, fore resistant to arcing, and provide higher resistance ranges at high voltages. Such materials also can be selected, as discussed in conjunction with FIG. 7, to exhibit the avalanche characteristic. Ohmic-contact materials regulate current flow by conversion of electrical energy to heat, whereas the rectifying-contact materials, at least partially, utilize the typical rectifier principle to block current.

A transducer or variable resistor using rectifying-contact particulates is shown in FIGS. 8 and 9, to which reference is now made. The transducer 30 is configured as a generally planar element having a base support surface 34 upon which the other components are mounted or to which they are coupled. External electrical connections are made via a pair of parallel disposed leads 31, 32. Each lead 31, 32 is electrically connected to a different base electrode 36, 38, mounted on the base support 34, the base electrodes 36, 38 being separated from each other in an intermediate region of the transducer 30. A pair of variable resistance elements 40, 42, comprising relatively thin planar elements disposed on the electrodes 36, 38, are in electrical series with the respective terminals 31, 32 but separate from each other. The planar electrodes 36, 38 are of greater area than the elements 40, 42, to provide extended regions at which the terminal connections may be made.

A conductive cap piece electrode 44 is disposed proximate and substantially coextensive with the pair of resistance elements or pads 40, 42, in bridging relation to both elements. The cap piece 44 in this example is normally in light contact with the elements 40, 42, but may bear against the elements 40, 42, with a predetermined initial force. For purposes of rigidity, insulation and protection from wear, the outer surface of the conductive cap piece 44 is coated or otherwise covered with a layer of insulating material 48. The cap piece 44 and a coextensive backing 48 are imbedded in a sealant 46 which extends about the periphery of the transducer 30, and mechanically joins and seals the terminals 31, 32, the base electrodes 36, 38 the resistance elements 40, 42 and the cap piece 44.

The arrangement of FIGS. 8 and 9 is readily fabricated, and so arranged as to minimize forces transmitted to the unit through its electrical leads 31, 32. Tension on one or both of the leads 31, 32 acts primarily on the base support 34 and not on the variable resistance elements 40, 42, or the cap piece 44. The base surface 34 may, if desired, be bonded onto a rigid surface. When force is applied to the cap piece 44 via the sealant cover 46, the cap piece 44 exerts force in directions normal to the broad faces of the variable resistance pads 40, 42. Equal distribution of force is not necessary, but is generally preferred, and is of course readily achieved due to the slight elasticity of the pads 40, 42, the small size of the transducer 30, and the use of any suitable load distributing expedient, such as a loading pad instead of a point contact mechanism.

In the arrangement of FIGS. 8 and 9, the current flow under a suitable potential difference is from one terminal 31 through the associated support electrode 36, then through the contacting variable resistance element 40, through the conductive cap piece 44 and then through the opposite variable resistance element, support electrode and terminal. Current flow thus takes place substantially through the entire aera of each variable resistance element 40 or 42, in directions generally normal to the broad faces of the elements 40, 42. Thus the length of the blocking path is the sum of the thickness of elements 40, 42, but the heat generated never travels further than one-half the thickness of a single element before reaching a suitable heat sink. This feature is important in high voltage applications, and can be carried further by employing multiple pads bridged by multiple cap pieces, electrically in series with the terminals.

Figure 10:
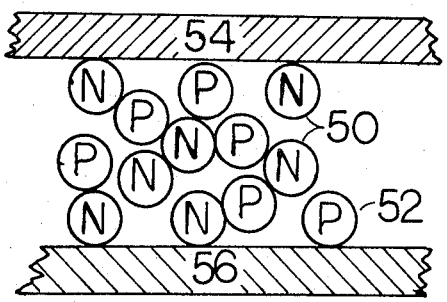
FIG. 10 is an idealized simplified representation of a fragment of the arrangement of FIGS. 8 and 9, illustrating the particle distribution in an unloaded state.

Rectifying-contact particulate masses such as semi-conductor powders can be utilized in many ways to provide various characteristics. The use of n-type semiconductor particles in combination with p-type semiconductor particles establishes rectifying contacts capable of blocking very high voltages, generally substantially in excess of the capabilities of ohmic-contact materials. Appreciation of the phenomenon involved will be better understood by reference to the idealized representations of FIGS. 10 and 12, and the idealized schematics of FIGS. 11 and 13. In FIG. 10, the representation is of a plurality of n-type semiconductor particles 50 and a plurality of p-type semiconductor particles 52 uniformly dispersed within a confined volume between a pair of electrodes 54, 56, the unloaded state being represented in FIG. 10 and the mechanically loaded state being represented in FIG. 12. The rectifying-contact materials may be considered to comprise a large but finite number of similar diodes connected back to back and therefore blocking current in both directions. A contact resistance is present in the region of contact with the electrodes 54, 56, this contact resistance being variable in accordance with pressure, contact area and material. Just as discrete diodes leak electrically, to some degree, so do the rectifying-contact particles; this leakage increases in proportion to the shortening of the electrical path, which increases the voltage across each contact, and the decrease in atomic contact resistances as the loading force increases.

Figure 12:
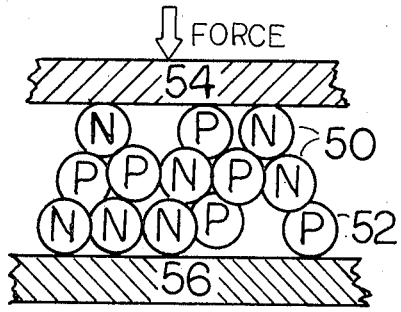
FIG. 12 is an idealized simplified representation corresponding to FIG. 10, but illustrating particle distribution in a mechanically loaded state.
Figure 11:
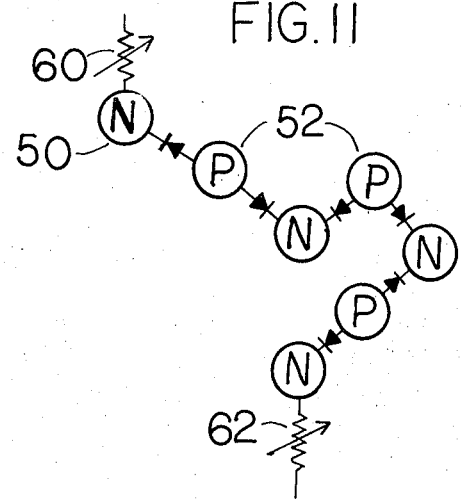
FIG. 11 is an idealized simplified representation of a typical current flow path in the state exemplified by FIG. 12.
Figure 13:
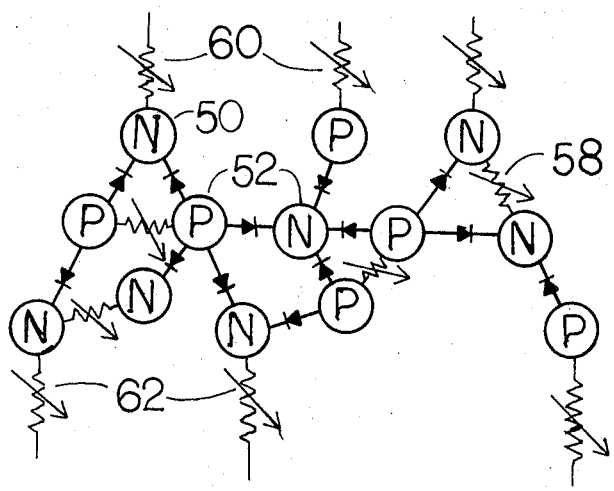
FIG. 13 is an idealized simplified representation of typical current flow paths in the state exemplified by FIG. 12.

Therefore, when the particles 50, 52 are in the mechanically loaded state, as represented by FIG. 12, the conditions shift, in these idealized examples, from those of FIG. 11 to FIG. 13. Substantially more intimate contact and greater contact areas are established, and the number of current paths is multiplied. These current paths include not only the back-to-back blockage effect between dissimilar particles 50, 52, but also a greatly increased number of contact resistances between p-type particles 52 in abutment and between n-type particles 50 in abutment. Consequently, as compaction increases, the contact resistances between similar particles, designated by the numeral 58, and the contact resistances between particles and the electrodes, designated by resistances 60 and 62, become very low, and the leakages between the rectifying-contact particles become substantially higher, contributing to the variable resistance effect and enabling high voltages to be handled without arcing. Whether rectifying or ohmic-contact principles are used, singly or in combination, current is passed bidirectionally through the device.

One specific example of material having a rectifying-contact characteristic comprises lightly oxidized copper powders, formed by grinding copper particles to the desired fineness, and chemically reacting for a period of time, as in atmosphere, until the surface of the material is covered with a thin layer of cuprous oxide ($Cu_2O$). The surface layer allows electrons to flow out of the particle readily, but blocks the flow of electrons into each particle. Particles may be sealed from further oxidation through the use of a binder or suitable encapsulation. Additionally, the resistivity may be substantially increased through the use of free cuprous oxide, although such material contributes to heating effects and frequently interferes with curing of the binder. Where the particles are to be used in confinement without a binder and subjected to rapid cycling rates, wear of the surface layer may cause some change in characteristics, and this may be minimized through the use of an incorporated oxidizing agent such as $Mn_2O_3$ powders.

Copper oxide materials of small thickness, such as .010 inch, may be used without breakover in applications of up to approximately 120 volts AC (RMS). Higher voltages may also be used where thicker sections are employed. The copper oxide powders and particles illustrate further that electrical leakage is primarily dependent, in the rectifying-contact materials, on the surface properties of the particles, rather than the bulk resistivity of the interior of the particles.

The rectifying-contact materials generally are especially resistant to arcing, because the adjoining particles are in firm contact before the resistance drops low enough to permit appreciable current to pass.

A number of other materials have been employed, including conventional n-type semiconductor and p-type semiconductor materials. Rectifying-contact particles of other kinds that have been utilized to exhibit the same general properties include magnesium silicide ($Mg_2Si$), magnesium stannide ($Mg_2Sn$), and mixes of cuprous sulfide ($Cu_2S$) with magnesium particles. Advantageous results have also been achieved with molybdenum particles that have been surface-reacted to include a surface film or coating of molybdenum disulfide. This compound, as is well known, comprises an excellent dry lubricant and especially minimizes packing and wear effects while also apparently providing a metal-semiconductor rectifying action. The various different types of particles and powders can therefore be used to establish many varieties of solid junctions and contacts, including pn-junctions, point contacts, point contacts together with other combinations of materials such as metal-semiconductor contacts, and rectifying contacts between materials of different electron work functions. Furthermore, the rectifying-contact materials can be disposed in separate strata in a device, as well as mixed in a heterogeneous blend. The materials used and the manner of their volumetric dispersion are selected on the basis of the performance desired for the particular device.

Physical and electrical factors: Visualization of the principal operative parameters require appreciation of the three-dimensional and volumetric aspects of materials and devices in accordance with the invention, even though generally planar and very thin elements may be employed. The particles are small with respect to the total thickness and volume of material, and have sufficient density to exhibit the needed change in interparticle relationship when under minute compaction. The three-dimensional current flow paths that exist between the electrodes, therefore, are so numerous that there may be considered to be a multiplicity of essentially parallel current paths between the electrodes. Several significant points should be noted in this conjunction. Although the number of essentially parallel current paths is statistically large enough to provide a composite resistance that changes in a continuous fashion (becoming discrete or discontinuous under the avalanche effect) the number of current paths is still finite. Current paths between the particles are essentially both conductive and resistive in character even if no binders or insulating buffers are used. As is well known, a contact resistance exists between contacting conductive elements, this resistance depending, among other things, both upon the area of contact and the pressure exerted between the contacting conductive solids. It is postulated on the basis of present information that along with the increases in number of flow paths, total flow path area, and internal particle strain, the concurrent decrease in contact resistance is a significant factor leading to the sharp transition between widely separated resistive values for relatively small pressure changes. It is considered likely that as the intimacy of particle contact increases, a point is reached at which inter-atomic electron exchange between particles is markedly facilitated.

Particular advantage is taken of the three-dimensional aspects of current flow in certain specific devices described herein. The multiple current flow paths can follow generally curved as well as generally linear paths between electrodes. For example, when spaced apart electrodes are placed side by side and the force-sensitive resistive material bridges the two electrodes, the current flow paths through the particulates bridge the gap, in the manner of a fringing magnetic field. A similarly complex field distribution occurs when the electrodes are placed in a different nonparallel configuration, as they might be on adjacent sides of a small cube of variable resistance material. Therefore, the size, shape and relative dispositions of the electrodes with respect to the particulate mass are extremely important because of the increased facility in achieving particular characteristics.

It is also preferred, though not essential, that the particulate mass comprise somewhat regular particles. Acicular particles and various irregularities may be accepted without deleterious effects under may circumstances, especially when free from heavy compaction. Minmium hysteresis effects and wear, however, are best achieved when the particles are somewhat regular in shape, that is, of spherical, generally rounded or granular characteristic, and have a narrow range of particle size.

Appreciation of the three-dimensional aspect of the multiple current flow paths also assists in visualization of the voltage and temperature sensitive properties of these materials. It may be assumed that the contact resistances and the lengths of the current flow paths decrease while the number of current flow paths and the total current flow area increase substantially for a substantial increase in voltage, assuming the composite resistance is not at a value approaching infinity. Similarly, taking the simplest case of a mono-particulate mass of ohmic-contact particles confined without binder or buffer materials within a given volume, a change of temperature acts to provide a given expansion or contraction of the material, and thus to affect the number and length of current flow paths, and the flow path areas and interparticle contact resistances. Generally, the materials have a positive temperature coefficient of expansion and therefore resistance drops in response to a temperature increase demonstrating a negative temperature coefficient of resistance typical of semiconductors.

Modulation of characteristics: For most applications, particle sizes of approximately 100 mesh or smaller are utilized, it generally being preferred to employ approximately 600 mesh or larger. Where surface oxidation is employed, the size referred to is that existing prior to oxidation. For a given particle size, the volumetric density of the particles relative to the overall density of the confining volume is significant in establishing the characteristics of the material. Relative densities of between 80% and 98% of the total volume have been found most suitable. This may best be visualized in terms of the use of binder or insulating powders to fill the interspaces between the particles, because it may be seen that the resistance of the material in the unloaded state is inherently greater if a higher proportion of insulating binder or powder, or both in combination, is present. In general, insulating binders have a temperature coefficient of expansion substantially greater than that of the particulate mass, and consequently tend to cause resistance to rise with temperature and tend to minimize the resistance drop of the particulate mass as temperature increases, helping compensate temperature effects in instrumentation applications. Bonding agents, when used, usually determine operative temperature limits, inasmuch as excessive heat may change the bonding agent chemically or otherwise, and excessive cold may cause embrittlement. The binder should be elastic in character, i.e., seek to return to its original form when distorted. Elastomers are generally employed but many other compositions, including glass, can be used. It is generally preferred to minimize the amount of binder utilized for a given application, and to vary the characteristics as needed through the adjustment of other parameters.

Insulative buffering powders often are advantageous, and may be separately prepared and mixed in a precise proportion on a volumetric or weight basis. Packing effects (a primary source of hysteresis) may be minimized by matching the size and hardness characteristics of the buffering powders to the conductively active powders, which in turn should have a narrow size range. Hysteresis effects under high forces can be minimized by use of dry lubricants in powder or flake form such as molybdenum disulfide ($MoS_2$), graphite, iodine, or mica. These lubricating materials change the net resistivity of the product in accordance with the proportions used and their relative resistive values compared to the primary particles. While mica is insulating, the $MoS_2$, iodine and graphite particles are found to be semiconductive in nature.

Where the conductively active particles have positive thermal coefficients of expansion substantially smaller than the binders, buffering powders normally have even smaller thermal co-efficients of expansion. Ideally, the buffers should have the same or a larger coefficient of thermal expansion to compensate for that of the conductive particles. Thus, as temperature increases, the buffers would tend to expand as much or more than the conductors to find shorter paths between electrodes. Cupric oxide and ferric oxide, with minimum binders, are examples of such buffers.

Significant variations in properties, and predetermined tailoring of properties to given characteristics, may be achieved by using multi-particulate masses, of two different types of particles or more. In this respect it should first be noted that a given particle may have characteristics that are nonuniform in nature and essentially unique when employed in a particulate mass. Copper particles whose surfaces are oxidized to cuprous oxide ($Cu_2O$) are to be specifically noted in this respect.

True mixtures of materials vary widely in properties, dependent upon the components in the mixture defining the particulate mass, but the properties may be predicted in certain essential respects, in accordance with Chart I provided below.

CHART I.—QUALITATIVE MATERIAL PROPERTIES PREDICTION CHART

| | Conductor (low $\varphi$) | Conductor (high $\varphi$) | Intrinsic S-C | Extrinsic S-C (equally P & N impurities) | "P" Type S-C | "N" Type S-C |
|---|---|---|---|---|---|---|
| Conductor (low $\varphi$) | O-P | O'-A'-P | O'-A' | O'-A' | R-A | R-A |
| Conductor (higher $\varphi$) | O'-A'-P | O-P | O'-A' | O'-A' | R-A | R-A |
| Intrinsic S-C | O'-A' | O'-A' | O'-A'-N | O'-A'-N | O'-A'-N | O'-A'-N |
| Extrinsic S-C (equally P & N impurities) | O'-A' | O'-A' | O'-A'-N | O'-A'-N | O'-A'-N | O'-A'-N |
| "P" Type S-C | R-A | R-A | O'-A'-N | O'-A'-N | O'-A'-N | R-A-N |
| "N" Type S-C | R-A | R-A | O'-A'-N | O'-A'-N | R-A-N | O'-A'-N |

Note.—O represents Ohmic-Contact; O' represents Ohmic-Contact unless large $\Delta\varphi$ (in which case it is rectifying); R represents Rectifying-Contact; A represents Possible Avalanche Effect; A' represents Avalanche Effect Possible if large $\Delta\varphi$; N represents Negative Temperature Coefficient unless compensated; P represents slightly negative to Positive Temperature Coefficient unless compensated.

In above Chart I, the following definitions are utilized: (a) $\varphi$ represents the electron work function of the chosen particulate material; (b) An "extrinsic" semiconductor is taken for purposes of this discussion to be an impure semiconductor in which the impurities are approximately balanced between $p$ and $n$ type particles within the bulk material; (c) "P" type S-C is a semiconductor in which the majority carriers are "acceptor" type, i.e. "P" type impurities are in the majority; (d) "N" type S-C is a semiconductor in which the majority carriers are "donor" type; i.e. "N" type impurities are in the majority.

It will be understood that when the material of a given row is mixed with the material of a particular column, the resultant properties are generally those denoted at the point of intersection between the row and column. A number of significant factors may be observed from the relationship of the different types of materials, including the following:

(a) when ohmic-contact materials of nearly equal electron work functions are mixed, essentially ohmic-contact elements result.

(b) when there is a large electron work function difference ($\Delta\phi$) between two ohmic-contact materials, the particulate mass is rectifying in nature, blocking most current flow equally in both directions, at higher voltages than (a).

(c) mixtures of like intrinsic or like extrinsic semiconductors provide ohmic-contact devices.

(d) "p" or "n"-type semiconductors used with particles of like conductivity provide an ohmic-contact effect in the absence of a large $\Delta\phi$ relationship, but provide a metal-semiconductor rectifying-contact when used with an ohmic material, or p-n- rectifying-contact when used with a material of opposite conductivity type.

(e) an avalanche effect is possible with either "p" or "n" type semiconductor material mixed with the opposite type, or with any type of material having a sufficiently large $\Delta\phi$. (Note: $\Delta\phi$ effects are enhanced by the use of buffers, which maintain small spaces between particles.)

(f) the semiconductor materials, mixed without typical ohmic materials, have an inherent negative bulk temperature coefficient whereas the ohmic materials have an inherent positive bulk temperature coefficient, which may be made slightly negative by surface effects.

A number of different examples are given herein as to variations in configuration that may be employed. In addition to these, it will be appreciated that a fundamental variable is the volume of material, including particularly but not limited to the spacing between the electrodes. Mixtures of materials may be provided that are non-heterogeneous, inasmuch as the composite structure may be built up of many layers of different types of material, each having a different one of two or more particulate masses. The initial resistance value and sensitivity of a particular element may be shifted to a selected level by adjusting the voltage applied between the electrodes.

It is thus evident that several broad classifications may be defined, namely the ohmic-contact types, the rectifying-contact types, composite types and mixtures. All are bi-directional in that they can handle both alternating and direct current. The materials can be used in entrapped powder form or as fillers in insulating binding agents. They vary widely in their ability to block voltages, repeatability of characteristics, arc resistance, response to heat and cold, wear, and resistance to permanent deformation under load.

Being bidirectional in nature, these devices have particular advantage in many switching circuits, can be incorporated in an assembled unit without fear of accidental reversal, and can be used where unidirectional characteristics are not tolerable, as with transformer circuitry. At low voltages, ohmic-contact types in thin section can provide very wide resistance ranges. With all materials, breakover can be prevented by the use of thicker material layers, or lower voltages, or both. It is generally preferable to select materials capable of blocking the design voltage in the thinnest possible sections because thinner sections reduce hysteresis, display higher frequency response, and dissipate heat more readily into the electrodes.

Figure 14:
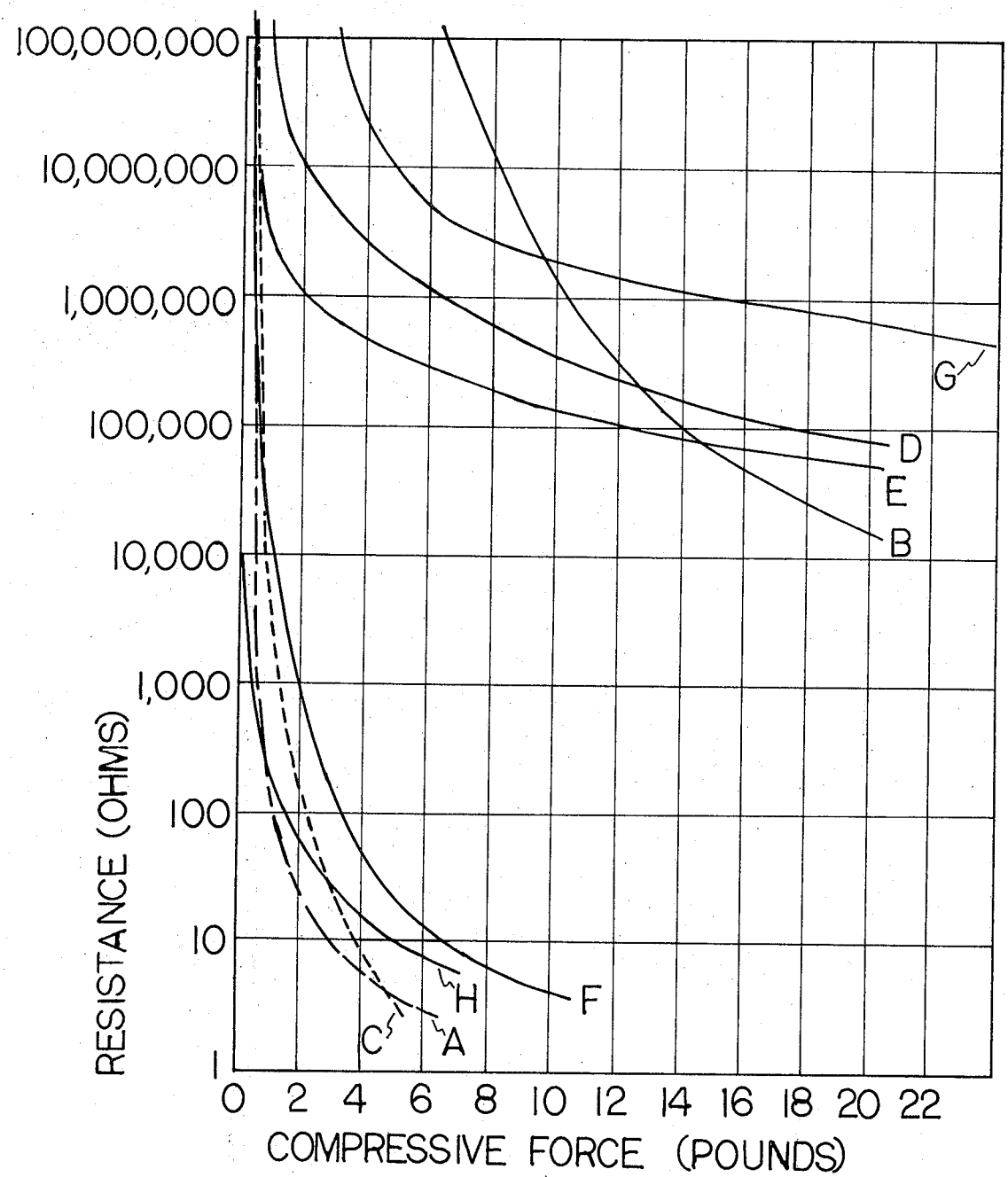
FIG. 14 is a graphical representation of force versus resistance characteristics for a number of specific materials in accordance with the invention.

Specific materials: The characteristics of a number of particular materials in accordance with the invention are shown in FIG. 14, in which the ordinate is a logarithmic scale of resistance in ohms, and in which the abscissa is a scale of force applied in pounds. As in conjunction with FIG. 7, applied force is a more realistic representation of actual operative requirements than is the pressure.

In FIG. 14, the ohmic-contact materials designated A to H were prepared as mono-particulates or bi-particulates, without binders, and disposed in a conductive cup electrode having a one-half inch diameter recess with a flat bottom. A movable piston electrode of 0.284 in.$^2$ area was disposed within an encompassing insulating sleeve in the cup electrode, and a voltage of one and one-half volts DC was impressed across the electrode. Different variable resistance particulates all of approximately 600 mesh size were disposed between the electrodes and subjected to the forces indicated on FIG. 14 to provide the response characteristics of curves A to H. All readings were taken at room temperature, for the following materials and amounts:

(A) tungsten carbide (2 grams)
(B) tungsten carbide (1 gram) aluminum oxide buffering powder (0.5 gram)
(C) nickel (2 grams)
(D) stannous oxide (2 grams)
(E) cobalt (1 gram)
(F) zinc (1 gram)
(G) boron (1 gram)
(H) titanium (1 gram)

Example III

Figure 15:
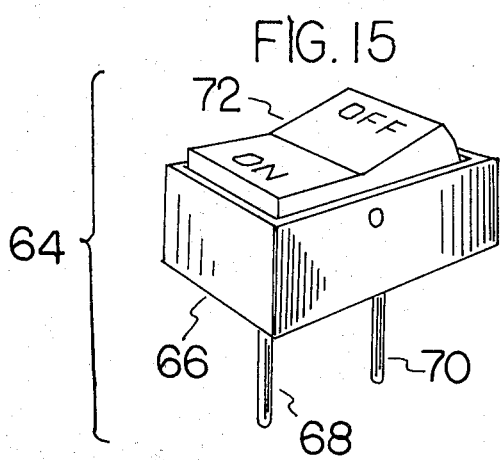
FIG. 15 is a perspective view of a different device in accordance with the invention, utilizing a combination of conductive and semiconductive particulates in rectifying-contact arrangement.
Figure 16:
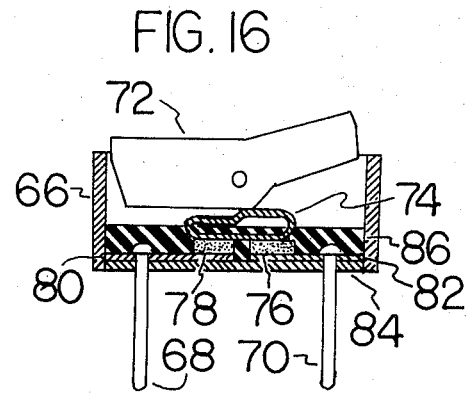
FIG. 16 is a side sectional view of the arrangement of FIG. 15.
Figure 17:
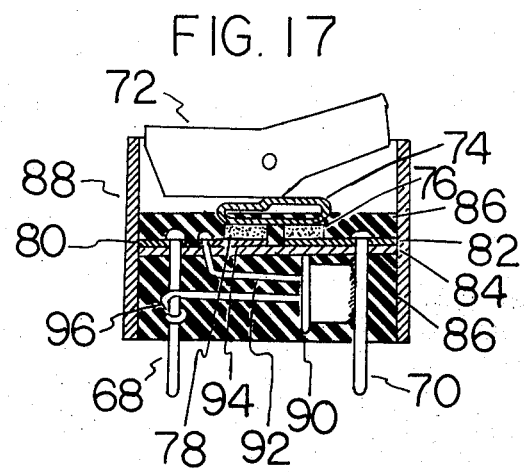
FIG. 17 is a side sectional view of a device corresponding to that of FIGS. 15 and 16, but including additional elements.

The device of FIGS. 15 and 16 and the related device of FIG. 17 illustrate one manner in which arrangements in accordance with the invention may be arranged to function in a binary fashion, both mechanically and electrically. It will be appreciated, however, that bistate or binary operation may be achieved either mechanically or electrically when using materials in accordance with the invention, depending upon the needs of the particular application.

FIGS. 15 and 16 illustrate a switching device 64 that may be employed as an on-off switch utilized in any conventional fashion. The switch is enclosed in any suitable housing 66 and external electrical connection is made via a pair of conventional terminal studs 68, 70. A two position manual toggle 72 for the switch 64 comprises a bistate mechanism illustrative of one form of binary operation. The toggle 72 is pivotally mounted in the housing 66 and is mechanically biased by a spring electrode 74 to be mechanically stable in either of two positions. The spring electrode 74 is in the form of a resilient loop, and is of conductive material. In one of the positions the spring electrode 74 bears with a predetermined force against a pair of planar variable resistance elements 76, 78. In reaching this position, a shoulder on the toggle 72 rides over a shoulder on the spring electrode 74 to be retained in mechanically stable position, by virtue of the fact that the spring electrode 74 force is over center relative to the pivot point and seeks to rotate the toggle 72 against its limit position. This pivotable over center arrangement is readily fabricated and particularly economical, but many alternatives will present themselves to those skilled in the art. In the other position of the toggle 72, the toggle 72 is released and the spring electrode 74 is not mechanically loaded, although it is also feasible to achieve the switching action by simply dropping the mechanical loading below a predetermined force value.

The internal mechanism is best seen in the side sectional view of FIG. 16. The spring electrode 74 is disposed to bear against and bridge the pair of spaced planar elements 76, 78 of variable resistivity material. These elements 76, 78 in turn rest upon a pair of spaced apart conductive electrodes 80, 82, each of which is electrically coupled to a different one of the leads 68, 70. These support electrodes 80, 82 lie upon a stratum 84 of insulating material which is mechanically retained within and sealed by a potting material 86.

The arrangement of FIG. 17 corresponds to that of FIGS. 15 and 16, except that associated circuitry is represented generally in an extended housing 88 by a semiconductor or integrated circuit component 90 that is electrically coupled across the variable resistance elements 76, 78, and surrounded by potting material 86. The active circuit element 90 may comprise a transistor amplifier biased to a predetermined level to be switched on and off dependent upon the state of the toggle 72, or a silicon controlled rectifier that may also be switched on and off to provide half wave rectified AC, or a "Triac" circuit, for switching full wave alternating current. In these examples, the semiconductor gate 92 connects to a support electrode 94, and the power output 96 connects to the lead 68. Many other examples could be given, these merely being illustrative of the situation in which bistate control of electric currents can be effected without wear, arcing or sharp transients.

Certain advantageous features in the construction of FIGS. 15-17 should be noted. The support insulating material 84 and the support electrodes 80, 82 or 94, 82 may be formed by conventional circuit board techniques, utilizing etching or deposition of conductors on a substrate. Circuit connections to the active circuit element 90 may also be provided by, as shown, soldering directly to the lead 70, or by disposing an additional conductor on the underside of the insulating material, with plated through apertures, eyelets, or other expedients being utilized if desired. This construction provides a substantial intimate contact area between the electrodes 80, 82 or 94, 82 and the variable resistance elements 76, 78, and thus provides excellent heat dissipation through the conductive elements as well as the desired physical support. The two position or toggle-type mechanism may also comprise a detent mechanism or a magnetic overcenter toggle assembly.

The device of FIGS. 15 and 16 comprises a switch which is open when the spring electrode 74 is not under pressure, because the resistive elements 76, 78 are then in their high resistance states, blocking or greatly attenuating current flow between the terminals 68, 70. In the device of FIG. 17, the active circuit component 90 is turned on or off through change of the variable resistance elements in the gate circuit. Thus the resistance change causes a bias voltage to shift in alternate directions across the firing threshold level, and the active circuit element 90 directly controls current flow. This arrangement effects current control without generating substantial heat.

Figure 18:
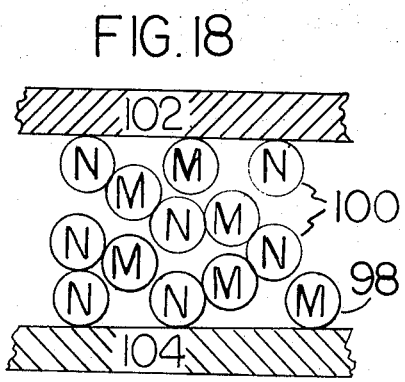
FIG. 18 is an idealized simplified representation of a fragment of the arrangement of FIGS. 15, 16 and 17, illustrating the particle distribution in an unloaded state.
Figure 19:
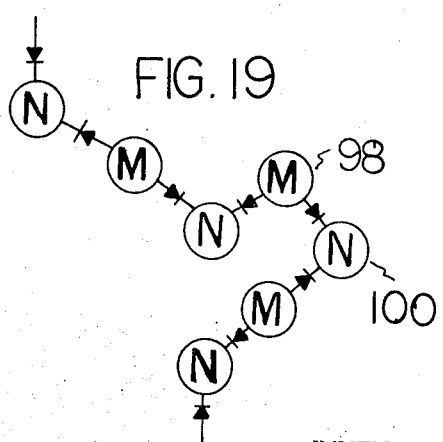
FIG. 19 is an idealized simplified representation of a typical current flow path in the state exemplified by FIG. 18.
Figure 20:
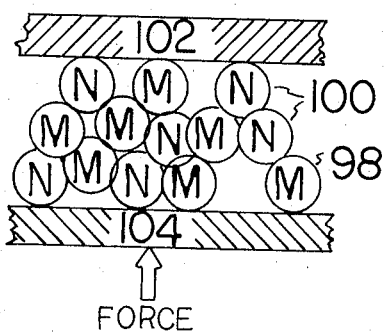
FIG. 20 is an idealized simplified representation corresponding to FIG. 18, but illustrating particle distribution in a mechanically loaded state.
Figure 21:
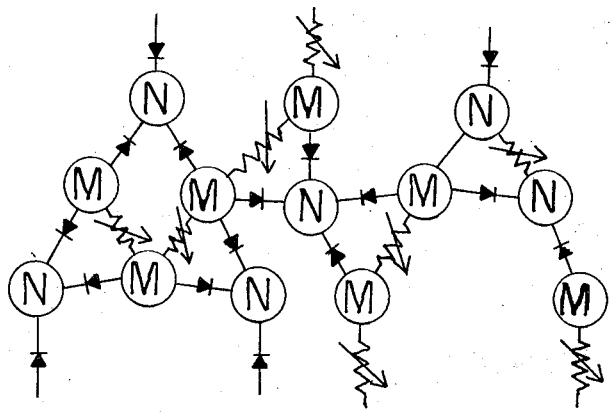
FIG. 21 is an idealized simplified representation of typical current flow paths in the state exemplified by FIG. 20.

It is preferred, however, to augment the bistate operation in the example of FIGS. 15–17 through the use of variable resistance materials having an avalanche characteristic. The specific example is that of a mixture of metal (conductive) and semiconductive particles, comprising a particulate mass of rectifying contact particles, thus illustrating another aspect of the Materials Properties Prediction Chart (Chart I) above. Reference should be made to the idealized volumetric representations of FIGS. 18 and 20 and the idealized fragmentary circuits of FIGS. 19 and 21, showing operation in the unloaded and loaded states. The conductive particles comprise metal particles 98, such as copper. The semiconductor particles comprise N type semiconductor particles 100, such as germanium, and an elastomeric binder is employed to retain the particles in essentially non-expandable form.

In the unloaded state, FIG. 19, circuit paths through the confined particulate mass of particles 98, 100 are predominantly established via the alternate semiconductor particles, 100 (also designated N) and the metal particles 98 (also designated M). These metal to semiconductor junctions are both rectifying and resistive, the rectifying characteristics being here represented by appropriately poled diodes, and the resistive component being omitted for simplicity. In the mechanically loaded state, when forces are exerted on the electrodes 102, 104, the number of parallel circuit paths is substantially increased, and in addition to the rectifying circuit paths a substantial number of ohmic-contact circuit paths are established between abutting metal particles 98, and also between abutting semiconductor particles 100. At some predetermined point for a given applied voltage during the compression of the materials, the very high resistance between the electrodes abruptly drops to a very low value. While the phenomenon is not fully understood at the present time, its existence with a variety of materials, and its characteristics, have been clearly established. The shortening of the current flow path during compression of the particle mass, together with the decreased number of blocking contact junctions (hence more volts per contact), the increased number of paths, the increased internal strain and the increase in mean area of electrical path, and the increased intimacy of contact causes a substantially simultaneous breakdown in the electric barriers between particles. For semiconductive materials, and for mixtures, this may be visualized in terms of reduction of the number of barrier regions that withstand the applied electric potential. For the same reason, it appears that composite materials, such as copper particles having a $Cu_2O$ surface, or molybdenum particles having an $MoS_2$ surface, are subject to the same effect. The avalanche effect also occurs, however, in ohmic-contact particle mixtures in which at least two different types of particles having large differences in electron work function ($\Delta\theta$) are included. It has been found that a $\Delta\theta$ in excess of approximately 0.25 ev. is desirable. Satisfactory mixtures of copper-aluminum, copper-silicon, silicon-aluminum, carbon-aluminum, iron-aluminum and iron-silicon have provided the avalanche action but of these copper-aluminum and copper-silicon had superior properties in blocking high voltages and exhibiting the avalanche effect. Rectifying-contact materials are especially resistant to arcing because adjoining particles are in firm contact before resistance drops low enough to permit appreciable current to pass, and even firmer contact before avalanche occurs. Similarly as compressive force is removed de-avalanching takes place while there is still firm contact thus avoiding ionizing discharge effects as current flow ceases.

A superior avalanche effect is also provided by copper/copper-oxide materials. One such material, disposed in a neoprene binder and nylon fabric mesh carrier, and formed in a 0.25 disc, exhibits a voltage drop of less than 0.5 volt when conducting over one ampere of current whereas it can also block 120 volt AC (RMS) in the unloaded state. Even higher voltages have been blocked by copper-aluminum mixtures when the copper powders are lightly oxidized.

The avalanche condition is achieved with sufficient voltage difference for the forces applied. At lower voltages the elements produce leakage currents which are analogs of applied forces. Different thicknesses of material therefore can be selected to provide analog or switching devices as desired, at given voltages.

For optimum switching effects, it is often preferable to use materials demonstrating the avalanche effect, but also having very low bulk resistivity. This combination of factors permits blocking of high voltages and the passage of maximum current when in the avalanched state, with minimum heating. The most economical material tested and best meeting these requirements is the copper powder having a surface coating or film of $Cu_2O$. These devices are also quite economical to fabricate, since a measured amount of copper powder can be oxidized in situ on an electrode or in an electrode cup; this bonds the composite powder in place with $Cu_2O$ while making the necessary surface modification. Addition of a penetrating bonding elastomer can then increase the strength of the powder-electrode bond.

Referring again to the Materials Properties Prediction Chart, Chart I above, it will be seen that a mixture of semiconductive materials of the extrinsic semiconductor materials, that is by this definition an essentially equal mixture of p and n type impurities within each particle, do not provide the avalanche action unless a large difference in work function exists. In these cases, the fact that the material is semiconductive does not affect properties except generally to raise bulk resistivity and create a negative bulk temperature coefficient of resistance.

Example IV

Figure 22:
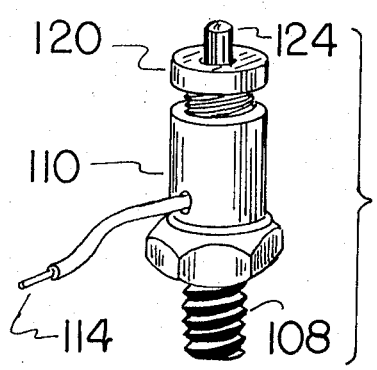
FIG. 22 is a perspective view of a force-sensitive device with adjustable initial resistance in accordance with the invention.
Figure 23:
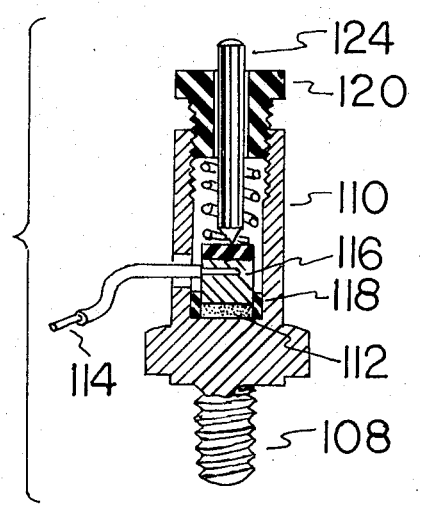
FIG. 23 is a side sectional view of the device of FIG. 22.

Analog devices and applications in accordance with the invention are illustrated by the arrangement of FIGS. 22 and 23. This element may comprise a switch, a variable resistance unit or a sensing transducer for electrical circuitry. The specific example shown in a component 106 mounted on a typical threaded rectifier stud 108. A hollow cylindrical body 110 having a flanged base supports a planar disc 112 of force-sensitive resistance material. The threaded stud 108 itself serves as one of the two electrical conductors, the other conductor comprising an external lead 114 coupled to a conductive piston 116 slidably mounted within an insulative sleeve 118 disposed within the hollow cylindrical body 110. An insulative threaded cap 120 is threaded into the open end of the hollow cylinder 110 and bears against the coupled end of the piston electrode 116 through a spring 122. Adjustment of the base resistance value of the device is made by rotating the cap 120 in or out, to vary the amount of bias force exerted on the disc 112 by the spring 122. Where the device is intended to sense an external force or displacement, an additional element 124 is required to apply the external force against the plug electrode 116. This plunger 124 passes through an axial hole in the threaded cap 120, but is not loaded as the cap is screwed into the cylinder 110. Thus the force plunger 124 applies to the plug electrode 116 is entirely the external force. Plunger 124 is omitted where the device 106 is intended for rheostat applications.

In the arrangement of FIGS. 22 and 23, a resistance starting point or switch bias loading is selected by rotation of the cap screw 120. The force-sensitive material 112 is in this example chosen as a mixture of ohmic-contact particles with buffering particles of comparable size and hardness values, but of an insulative character.

The specific materials employed in one practical example are tungsten carbide for the conducting powder and aluminum oxide for the buffer powder, all particles being classified closely to approximately 600 mesh. The utilization of non-galling particles of this narrow size range and comparable (though not identical) high hardness values minimizes most of the tendency of the materials to pack and wear, thus becoming subject to hysteresis effects.

Another aspect of the use of buffering powders is that the ratio of buffering powder to conductive (or semiconductive) particle may be varied so as to modify the end point positions on the resistance force curve (see curves A and B in FIG. 14). In the present example approximately equal quantities are used, but an increase in the ratio of conductive or semiconductive powder to buffer powder lowers both the start and end point resistance values for given forces. Where the conductive or semiconductive powder alone has high initial resistance the increase may be difficult to detect, but the increase in end resistance is readily apparent.

Voltage responsive devices: As previously described, the force-resistance relationship is substantially linear over wide useful ranges for a given voltage. The sensitivity of the device may be increased by increasing the applied voltage. Unlike conventional resistors, increasing the applied voltage produces an exponential (not a linear) increase in current at a given force level.

Figure 24:
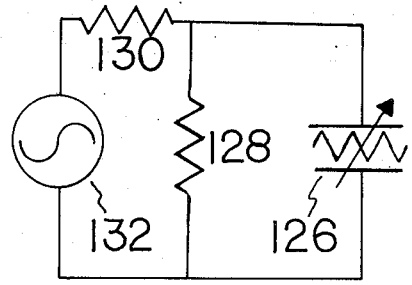
FIG. 24 is a schematic representation of an adjustable voltage-sensitive arrangement in accordance with the invention.

The same exponential response to voltage may also be utilized in accordance with the invention in voltage-regulating components for electrical and electronic systems and circuits, as illustrated in FIG. 24. A variable resistance device 126 is indicated symbolically as an adjustable resistor having electrode terminals. A circuit load 128 is indicated generally as a resistor coupled through a dropping resistor 130 to a voltage supply 132, the voltage supply also being indicated generally. It will be recognized that the voltage supply 132 and the resistors 128 and 130 represent, in generic form, any simple or complex circuit, of high or low power, which is desired to operate with a controlled voltage across that part of the system constituting the circuit load 128. Other elements that may be employed have not been illustrated for brevity and simplicity.

The variable resistance element 126 may have a set initial value determined by its configuration, with or without a fixed mechanical bias, and in some applications may be a simple shunt between adjacent conductors on a printed circuit board, but is here assumed to be a mechanically adjustable element as is illustrated in the structure of FIG. 23. Consequently, a selected resistance value for the element 126 may be chosen, with respect to a given applied voltage, the element 126 constituting a current shunt for the circuit load 128. A substantial increase in the voltage across the circuit load 128 immediately is sensed at the variable resistance element 126, the resistance of the element 126 dropping substantially immediately to pass more current through the dropping resistor 130, thereby immediately damping the voltage transient or fluctuation. Although Zener devices and other forms of conventional voltage regulation may be employed as well, if desired, the present form of voltage compensation is particularly advantageous for many practical applications. A single variable resistance element can be utilized to provide an external compensation for voltage sensitive devices and circuits, making possible external adjustability to achieve a higher degree of precision without placing stringent requirements on the voltage sensitive devices themselves.

Figure 25:
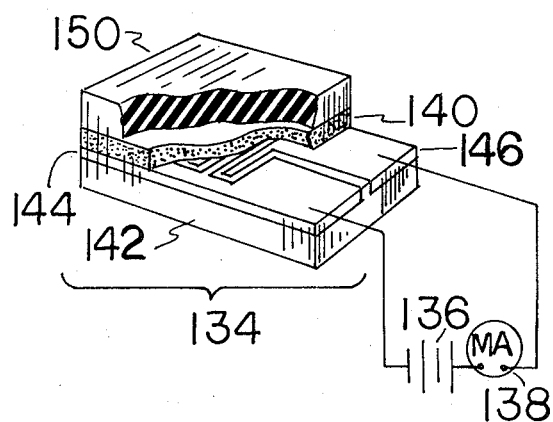
FIG. 25 is a combined schematic and perspective view, partially broken away, of a temperature-sensitive arrangement with adjustable initial resistance in accordance with the invention including a particularly advantageous disposition of electrodes and force sensitive material.
Figure 26:
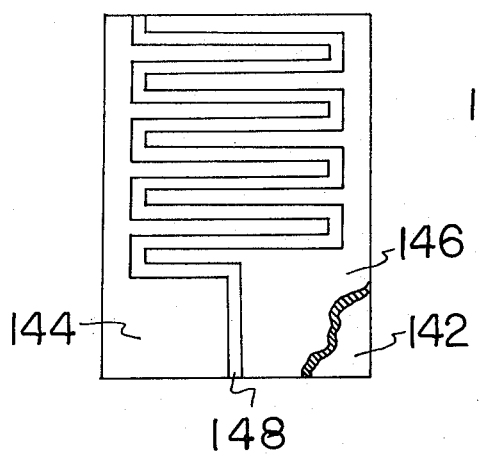
FIG. 26 is a plan view of the electrode arrangement of FIG. 25.

Temperature sensitive characteristics: The resistance variations with temperature of certain devices in accordance with the invention has previously been described, in terms of the effects taking place due to expansion or contraction, changes in bulk resistivity, and major changes in contact resistance or rectifier leakage. With predetermined voltage and applied force, therefore, these devices may be utilized directly as inherently temperature sensitive elements. A particularly advantageous arrangement for this purpose is illustrated in the fragmentary perspective view of FIG. 25, the electrode disposition being shown in greater detail in the plan view of FIG. 26. The variable resistance element 134 has a pair of electrodes between which is applied a predetermined voltage from a source 136. The device 134 may be maintained in the mechanically unloaded state, but preferably is subjected to a predetermined applied force on its broad faces to calibrate device resistance at a given temperature, the force applying mechanism being any of the forms previously illustrated or any other suitable mechanisms, and thus not specifically shown. A sensing circuit 138, such as a milliammeter, electrometer or voltmeter, is coupled in circuit with the variable resistance element 134, the circuit 138 here being shown in series electrically with the element 134, and comprising a milliammeter.

An electrode configuration is employed with the variable resistance element that facilitates the dissipation of heat generated internally within a layer of variable resistance material 140 (FIG. 25), maintaining the layer essentially at ambient temperature. The variable resistance material 140 comprises a stratum of particulate material such as (but not limited to) 600-mesh tungsten carbide, including a thin layer of binder such as (but not limited to) neoprene adhesive, substantially uniformly distributed on the particles, the stratum being disposed upon a generally (but not necessarily) rectangular substrate 142 for the electrode structure and in intimate thermal interchange contact with the electrodes. A circuit pattern disposed on the electrode substrate 142 divides the element into a first conductive electrode 144 and a second conductive electrode 146, these conductive patterns being formed by printing, etching or other suitable techniques. The patterns of the electrodes 144, 146 include interdigitated extensions such that a gap line 148 of non-conductive material extends across the substrate 142 from one side to the other, in serpentine or other sinuous fashion. The gap line 148 here has a generally angular sinuous form and is extremely long relative to the areas of the electrodes 144, 146. Electrical connections are made to a base portion of each electrode 144, 146. The element is completed by an external cover element 150, substantially co-extensive with the electrode members 144, 146, and transmitting distributed force to the variable resistance material 140.

Figure 27:
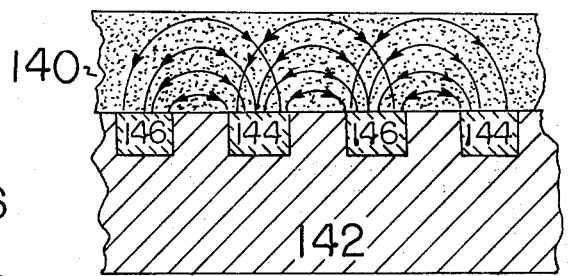
FIG. 27 is a idealized, greatly enlarged, sectional view of a fragment of the arrangement of FIG. 25, useful in describing current distribution therein.

As best seen in the enlarged idealized view of FIG. 27, a potential difference between the first and second electrodes 144, 146 disperses current through the volume of variable resistance material juxtaposed immediately adjacent the gap line 148. A current distribution gradient thus exists as indicated by the arched lines of flow between the electrodes 144, 146. Actually, of course, the particles are much more numerous and the current flow paths much more complex than shown. Nevertheless, current flow is greatest in the region immediately adjacent the gap line 148, but multiple and generally curvilinear current paths between the electrodes do exist at regions further spaced from the gap line 148. At some spacing from the gap line 148, however, current flow between the electrodes is minimal.

The composite current flow is determined by the composite resistance of the material 140, which in turn is dependent upon various factors and relationships. The bulk temperature coefficient of resistance is not to be equated to temperature coefficient of expansion, which may be small but is positive in sense. In the simplest case of confined active particulate without binder, thermal expansion tends to increase compaction and therefore reduce resistance, tending to create a negative bulk temperature coefficient of resistance, even in the presence of a positive temperature coefficient of resistance of the active material. Semiconductors, however, have inherent negative temperature coefficients of resistance, and thus increase the negative bulk coefficient. In the more complex example of a stratum employing binder or buffer materials, the insulative material tends to make the bulk coefficient more positive than with the corresponding active particulate alone, by opposing establishment of current paths. Binders, such as elastomers, typically have coefficients of expansion of approximately an order of magnitude greater than the active particulates. These materials thus can substantially affect the bulk coefficient of resistance, to render it strongly positive. Buffer powders, such as alumina or quartz, typically have smaller expansion coefficients than the active particulates and thus may be used to render the bulk temperature coefficient of resistance less negative, equalize the coefficient, or render it positive.

In the present example, the binder layer is thin, preferably less than approximately 0.0001 inch in average thickness, and therefore does not substantially affect temperature sensitivity although reducing wear and hysteresis.

This current distribution gradient arising from the coplanar disposition of the electrodes represents yet another aspect of the three-dimensional flow characteristics of devices in accordance with the invention. The variable resistance element 140 may be a separate sheet placed on the electrodes 144, 146, to limit entrance of the variable resistance material into the gap line space. The gap line 148 space may represent an air insulator, although a similar insulative effect may be achieved by filling the gap line along its length with an insulative material if it is desired to coat the element onto the electrodes.

The extremely long length of the gap line 148 and the consequent high volume of distributed current flow is accompanied by uniform and intimate contact between the variable resistance material and the associated conductive electrode elements 144, 146. Consequently, heat generated within the variable resistance element 140 is substantially immediately dissipated by virtue of the heat sink capabilities of the conductive electrodes 144, 146. These capabilities may, of course, be enhanced by increasing the volume of electrode material, and by using conventional heat sink constructions. Therefore, the element 134 comprises an adjustable thermistor whose initial resistance can be set by adjusting the force or applied voltage, or both, without adverse effects from internally generated heat.

It will further be appreciated that as described above, the composite temperature coefficient of resistance of these materials may be modified to provide selected characteristics for given applications. Where high temperature sensitivity is desired, for example, the binder or buffering powder should be minimized or have a low coefficient of expansion, or both. Inasmuch as certain available materials, such as the semiconductor materials, have inherent negaitve bulk temperature coefficients of resistance, a further variable is made available for adjustment of the bulk coefficient.

The speed of response to temperature chanegs is dependent in large part on the size of the volume of variable resistance material. Extremely small particulate masses have been utilized, to provide transducers of approximately .005 inch thickness and .005 inch in diameter. In practical devices in accordance with the invention, temperature sensitivity has been enhanced by the use of bimetallic elements (as in FIG. 28 below, but in a sense to augment the response characteristic). Units have resulted exhibiting a 75% change in resistance value for 10° F. temperature change, with the operating range being set by an adjustable spring force mechanism (FIGS. 22 and 23). By using an avalanche effect material, a thermally actuated switch with an adjustable set point is provided.

Figure 28:
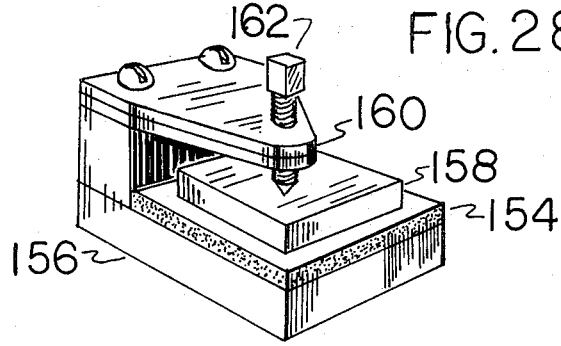
FIG. 28 is a perspective view of a temperature-compensated device in accordance with the invention.

Temperature compensated devices: A different construction in accordance with the invention is illustrated in FIG. 28, and is intended specifically for the full temperature compensation of a variable resistance material 154 is disposed between a support electrode 156 and a pressure pad electrode 158, these electrodes being shown in simplified form for brevity. The primary active particulate in the variable resistance material 154 is selected from the class of material mixes having a positive bulk temperature coefficient of resistance, such as tungsten metal particulates in conjunction with an active buffer such as high-resistivity silicon. The active buffer particles, however, have an inherent negative temperature coefficient of resistance (i.e., semiconductors). The opposing characteristics of the mixture and the active buffer greatly reduce temperature sensitivity and provide adequate temperature compensation for most applications in which some degree of compensation is needed, by tending to vary the compaction of the particle mass in inverse relation to temperature.

Additionally, however, mechanical temperature compensation may also be utilized, as exemplified by a bimetallic spring 160 bearing against the pressure pad electrode 158 with a variable force dependent upon temperature. The bimetallic spring 160 acts as a varying mechanical loading dependent upon temperature, and compensates for temperature variations in the characteristics of the material. This or any other form of mechanical compensation may of course be used independently of techniques based upon materials selection. In any event, changes in the variable resistance material that are due to thermal effects are fully or substantially cancelled. A base operating level may be selected by adjustment of a screw 162 threaded through the spring 160 and bearing against the pressure pad electrode 158.

While there have been described above and illustrated in the drawings various materials, devices and processes in accordance with the invention, it will be appreciated that the invention is not limited thereto, but encompasses all internal forms and modifications falling within the scope of the appended claim.

What is claimed is:

1. A resistive material comprising at least a first particulate material and at least one insulative material, the particulate material having at least some electrical conductivity, the particulate and the insulative material being volumetrically distributed and minutely compressible, the size and density of the particles therein providing essentially randomly distributed multiple current flow paths whose average length, area, particle contact and resistive value vary cumulatively in the same sense, with surface resistivity at the particle interfaces comprising a major portion thereof, to change the composite resistance value of the material with a wide dynamic range for changes in the compression of the material, and wherein the first particulate material comprises copper particles, having a cuprous oxide surface and no greater than approximately 100 mesh size prior to surface oxidation, wherein the insulative material comprises an elastomer, and wherein in addition the material includes a fabric carrier throughout which the particles and the elastomer are distributed.

References Cited

UNITED STATES PATENTS

| | | | |
|---|---|---|---|
| 2,624,822 | 1/1953 | Becker | 338—100 |
| 2,987,687 | 6/1961 | Palmeri | 252—521 |
| 3,125,739 | 3/1964 | Deibel et al. | 338—99 |
| 3,243,753 | 3/1966 | Kohler | 252—510 |
| 3,386,067 | 5/1968 | Costanzo | 338—100 |
| 2,690,489 | 9/1954 | Jerret et al. | 252—511 |
| 2,799,051 | 7/1957 | Coler et al. | 252—511 |
| 2,951,817 | 9/1960 | Myers | 252—518 |
| 3,194,860 | 7/1965 | Ehrreich | 252—511 |
| 3,412,043 | 11/1968 | Gilliland | 252—518 |
| 3,465,278 | 9/1969 | Kerns et al. | 252—518 |

DOUGLAS J. DRUMMOND, Primary Examiner

U.S. Cl. X.R.

338—99

UNITED STATES PATENT OFFICE
CERTIFICATE OF CORRECTION

Patent No. 3,806,471      Dated April 23, 1974

Inventor(s) Robert J. Mitchell

It is certified that error appears in the above-identified patent and that said Letters Patent are hereby corrected as shown below:

Column 1, line 28, after "contact", for "residence" read --resistance--. Column 5, line 23, after "state" strike out the comma and insert a semicolon. Column 6, line 47, after "disposition." strike out "The". Column 8, line 40, after "and" for "excelent" read --excellent--; line 58, after "the" for "materails" read --materials--. Column 9, line 44, for "fore" read --more--. Column 10, line 8, after "38" insert a comma --,--; line 33, for "aera" read --area--. Column 11, line 19, for "chemicalliy" read --chemically--; line 67, for "functions." read --function.--. Column 12, line 52, after "under", for "may" read --many--. Column 13, line 71, for "co-efficients" read --coefficients--. Column 14, line 15, after "but", "the" read --these--; Columns 13 & 14, in Chart I., fourth column heading, for "(equally P & N impurities" read --(equally P & N impurities)--; in Chart I, 2nd paragraph in NOTE, line 4, after "type" (first occurrence) strike out the comma and insert a semicolon. Column 16, line 27, for "restistivity" read --resistivity--; line 72, for "resitance" read --resistance--. Column 20, line 61, for "electrods" read --electrodes--. Column 21, line 53, for "negaitve" read --negative--; line 56, for "chanegs" read --changes--.

Signed and sealed this 17th day of September 1974.

(SEAL)
Attest:

McCOY M. GIBSON JR.
Attesting Officer

C. MARSHALL DANN
Commissioner of Patents